US012297113B2

(12) United States Patent
Hule et al.

(10) Patent No.: US 12,297,113 B2
(45) Date of Patent: *May 13, 2025

(54) PRODUCING GRAPHENE FROM COKE USING ELECTROCHEMICAL EXFOLIATION

(71) Applicants: ExxonMobil Chemical Patents Inc., Baytown, TX (US); The Texas A&M University System, College Station, TX (US)

(72) Inventors: Rohan Ashok Hule, Houston, TX (US); Micah J. Green, College Station, TX (US); Sanjit Saha, College Station, TX (US); Pritishma Lakhe, College Station, TX (US); Sundararajan Uppili, Jersey Village, TX (US); Sergey Yakovlev, Baytown, TX (US)

(73) Assignees: EXXONMOBIL CHEMICAL PATENTS INC., Baytown, TX (US); THE TEXAS A&M UNIVERSITY SYSTEM, College Station, TX (US)

(*) Notice: Subject to any disclaimer, the term of this patent is extended or adjusted under 35 U.S.C. 154(b) by 359 days.

This patent is subject to a terminal disclaimer.

(21) Appl. No.: 17/581,540

(22) Filed: Jan. 21, 2022

(65) Prior Publication Data

US 2022/0250914 A1 Aug. 11, 2022

Related U.S. Application Data

(60) Provisional application No. 63/143,323, filed on Jan. 29, 2021.

(51) Int. Cl.
*C01B 32/19* (2017.01)
*C25B 1/135* (2021.01)
*C25B 9/05* (2021.01)

(52) U.S. Cl.
CPC .............. *C01B 32/19* (2017.08); *C25B 1/135* (2021.01); *C25B 9/05* (2021.01); *C01B 2204/22* (2013.01);
(Continued)

(58) Field of Classification Search
CPC .. C25B 1/135; C25B 9/05; C25B 9/17; C25B 11/02; C25B 11/037; C25B 11/043; C25B 11/046; C01B 32/19; C01B 32/192
See application file for complete search history.

(56) References Cited

U.S. PATENT DOCUMENTS 4,350,576 A * 9/1982 Watanabe ................. C25B 1/00
                                                                    205/551
6,406,612 B1 * 6/2002 Greinke ................ C01B 32/225
                                                                    205/768
(Continued)

FOREIGN PATENT DOCUMENTS

CN          107673338       * 11/2017     ............. C01B 32/19
CN          107673338 A     *  2/2018
(Continued)

OTHER PUBLICATIONS

Applied Polymer Science, Bansala, et al., High-density polyethylene reinforced by low loadings of electrochemically exfoliated graphene via melt recirculation approach, Sep. 2020.
(Continued)

*Primary Examiner* — Luan V Van
*Assistant Examiner* — Andrew Koltonow
(74) *Attorney, Agent, or Firm* — CONLEY ROSE, P.C.

(57) ABSTRACT

A method of electrochemical exfoliation, may include: electrochemically exfoliating a parent material comprising coke, wherein the electrochemically exfoliating comprises introducing the parent material into a porous chamber, applying pressure to the porous chamber to thereby compress the
(Continued)

parent material in the porous chamber, and applying a potential bias to the parent material while at least a portion of the parent material is in contact with an electrolyte solution to produce a mixture of exfoliated material and unexfoliated parent material, wherein the exfoliated material comprises exfoliated graphene; and separating at least a portion of the exfoliated material from the unexfoliated parent material.

14 Claims, 9 Drawing Sheets

(52) U.S. Cl.
CPC ...... *C01P 2002/82* (2013.01); *C01P 2004/03* (2013.01); *C01P 2004/04* (2013.01)

(56) References Cited

U.S. PATENT DOCUMENTS

| | | | |
|---|---|---|---|
| 6,756,027 B2* | 6/2004 | Barsukov | C01B 32/22 205/768 |
| 11,821,095 B2* | 11/2023 | Hule | C25B 11/037 |
| 2013/0102084 A1 | 4/2013 | Loh et al. | |
| 2013/0161199 A1 | 6/2013 | Li et al. | |
| 2014/0061059 A1 | 3/2014 | Dryfe et al. | |
| 2017/0370009 A1* | 12/2017 | Zhamu | C25D 3/00 |
| 2019/0233291 A1 | 8/2019 | Achee et al. | |
| 2021/0057751 A1* | 2/2021 | Lanning | H01M 4/663 |

FOREIGN PATENT DOCUMENTS

| | | | |
|---|---|---|---|
| CN | 105731429 | 4/2018 | |
| WO | 2015075455 | 5/2015 | |
| WO | WO-2018031591 A1 * | 2/2018 | B01J 8/00 |

OTHER PUBLICATIONS

ACS, Hope, et al., Scalable Production of Graphene Nanoplatelets for Energy Storage, Oct. 2020.
Ghaffarzadeh, K. Graphene, 2D Materials and Carbon Nanotubes: Markets, Technologies and Opportunities 2016-2026. Available at http://www.idtechex.com/research/reports/graphene-2d-materials-and-carbon-nanotubes-markets-technologies-and-opportunities-2016-2026-000465.asp. Accessed Dec. 27, 2016.
Parviz, Dorsa; Irin, Fahmida; Shah, Smit A.; Das, Sriya; Sweeney, Charles B.; Green, Micah J. (2016). Challenges in Liquid-Phase Exfoliation, Processing, and Assembly of Pristine Graphene. Advanced Materials, 28, 8796-8818.
Abdelkader, A. M.; Cooper, A. J.; Dryfe, R. A. W.; Kinloch, I. A. (2015). How to get between the sheets: a review of recent works on the electrochemical exfoliation of graphene materials from bulk graphite. Nanoscale, 7(16), 6944-6956.
Achee, Thomas C.; Sun, Wanmei; Hope, Joshua T.; Quitzau, Samuel G.; Sweeney, Charles Brandon; Shah, Smit A.; Habib, Touseef; Green, Micah J. (2018). High-yield scalable graphene nanosheet production from compressed graphite using electrochemical exfoliation. Scientific Reports, 8(1) 2018, 8, 14525.
Sierra, Uriel; Álvarez, Patricia; Blanco, Clara; Granda, Marcos; Santamaria, Ricardo; Menéndez, Rosa (2015). New alternatives to graphite for producing graphene materials. Carbon, 93(), 812-818.
Cristina Botas; Patricia Álvarez; Clara Blanco; Ricardo Santamaría; Marcos Granda; Pablo Ares; Francisco Rodríguez-Reinoso; Rosa Menendez (2012). The effect of the parent graphite on the structure of graphene oxide., 50(1), 275-282.
Xing, Xiaohan; Zhang, Xiaohua; Zhang, Kang; Jin, Li'e; Cao, Qing (2018). Preparation of large-sized graphene from needle coke and the adsorption for malachite green with its graphene oxide. Fullerenes, Nanotubes and Carbon Nanostructures, (), 1-9.

* cited by examiner

PRODUCING GRAPHENE FROM COKE USING ELECTROCHEMICAL EXFOLIATION

FIELD

This application relates to processes and systems for electrochemical exfoliation that use a compression reactor and, more particularly, to processes and systems for electrochemical exfoliation of a petroleum coke feedstock to produce graphene.

BACKGROUND

Electrochemical expansion of nanosheets expands nanosheet parent materials to form an exfoliated product. Some carbonaceous parent materials comprising carbon with $sp^2$ hybridization may be exfoliated to form graphene when placed under an electrical potential bias. Electrochemical expansion may be carried out in the presence of chemical species which facilitate the expansion of the parent materials under the electrical potential bias. While electrochemical exfoliation of high-quality graphite and other carbonaceous materials with relatively large amounts of $sp^2$ hybridized carbon may produce good quality exfoliated product, there may be considerable cost in using high-quality feeds to produce exfoliated graphene. The present disclosure utilizes a modified electrochemical exfoliation process for producing graphene-like materials from coke-family materials.

SUMMARY

Disclosed herein are systems and methods for producing graphene-like materials from coke-family materials. A reactor for electrochemical exfoliation may include: a container configured to hold an electrolyte solution; a porous chamber, wherein the porous chamber is configured to hold a parent material comprising coke, and wherein the electrolyte solution is in fluid communication with the parent material; a pressure source positioned to apply a pressure to the porous chamber to thereby compress the parent material in the porous chamber; a first counter electrode; a working electrode; and an electrical power source in electrical communication with the first counter electrode and the working electrode.

Further disclosed herein is an example method of electrochemical exfoliation which may include: electrochemically exfoliating a parent material comprising coke, wherein the electrochemically exfoliating comprises introducing the parent material into a porous chamber, applying pressure to the porous chamber to thereby compress the parent material in the porous chamber, and applying a potential bias to the parent material while at least a portion of the parent material is in contact with an electrolyte solution to produce a mixture of exfoliated material and unexfoliated parent material, wherein the exfoliated material comprises exfoliated graphene; and separating at least a portion of the exfoliated material from the unexfoliated parent material.

BRIEF DESCRIPTION OF THE DRAWINGS

The drawings illustrate certain aspects of the present disclosure and should not be used to limit or define the disclosure.

DETAILED DESCRIPTION

Figure 1:
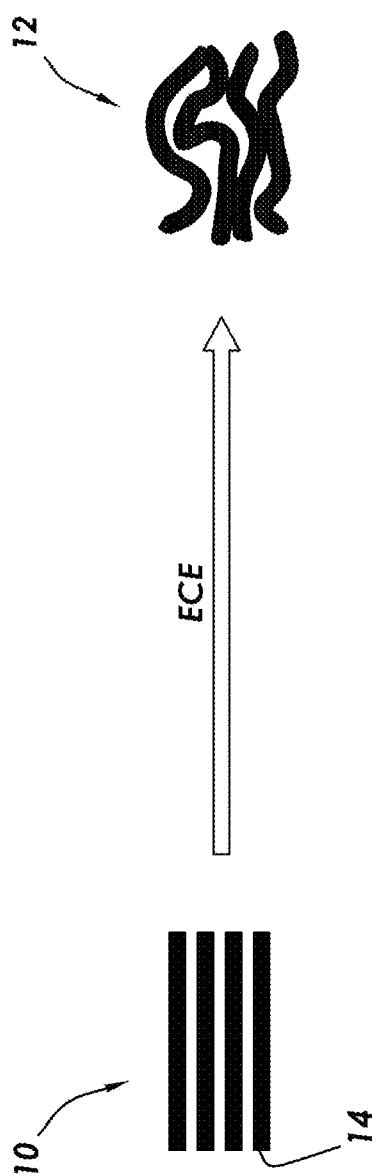
FIG. 1 is a schematic illustration of electrochemical exfoliation of a parent material.

The following is a detailed description of the disclosure provided to aid those skilled in the art in practicing the present disclosure. Those of ordinary skill in the art may make modifications and variations in the embodiments described herein without departing from the spirit or scope of the present disclosure. Unless otherwise defined, all technical and scientific terms used herein have the same meaning as commonly understood by one of ordinary skill in the art to which this disclosure belongs. The terminology used in the description of the disclosure herein is for describing particular embodiments only and is not intended to be limiting of the disclosure.

This application relates to processes and systems for electrochemical exfoliation that use a compression reactor and, more particularly, to processes and systems for electrochemical exfoliation of parent materials. Electrochemical exfoliation may include application of a voltage to a parent material under conditions which promote the exfoliation of the parent material. The exfoliation of the parent materials generally results in exfoliated materials, such as graphene. While these processes and systems may be suitable for exfoliation of a variety of parent materials, they may be particularly suited for exfoliation of parent materials with a layered planar structure. By way of example, the processes and systems may be used for exfoliation of coke to produce exfoliated sheets that includes graphene.

There may be several potential advantages to the methods and systems disclosed herein, only some of which may be alluded to in the present disclosure. As discussed above, current techniques for exfoliation of parent materials can be problematic due to relatively high cost of parent material. Further, electrochemical exfoliation can result in incomplete processing of the parent material when the rods of the parent material fall apart due to disruption of electric flow. Advantageously, embodiments of the present techniques for electrochemical foliation of parent materials can provide a scalable process that yields desirable levels of exfoliated material without typical problems associated with incomplete processing. Even further, embodiments of the present techniques for electrochemical exfoliation can provide improved kinetics and improved flexibility to produce exfoliated materials having a wide range of aspect ratios (length/thickness). For example, a maximum production rate for the electrochemical exfoliation may be achieved in about 30 minutes or less after initiation of the electrochemical exfoliation. In particular, present techniques have replaced rods of the parent material with compressed parent material. By way of example, the parent material may be placed in a porous chamber, and a pressure source may be applied along a length (e.g., a longitudinal length) of the porous chamber to compress the parent material. While submerged in an electrolyte solution, a voltage may be applied to drive ionic groups in the electrolyte solution to intercalate into the parent material thus, for example, increasing the inter-layer distance. In some embodiments, coke may be used as a parent material in the electrochemical exfoliation process to expand the coke into exfoliated sheets that includes graphene.

Embodiments may include exfoliation of parent materials. In some embodiments, the parent material includes a plurality of layers adhered or chemically bonded to one another. In some embodiments, at least some of the plurality of layers are adhered to one another through, for example, non-covalent bonds, such as hydrogen bonds, van der Waals forces, and the like. In some embodiments, the parent material may have a layered planar structure. In some embodiments, the parent material may be an electrically conductive material with a plurality of layers. FIG. 1 illustrates an example parent material in the form of a layered parent material 10 that has a layered planar structure. As illustrated, the layered parent material 10 may include a plurality of planar layers 14. In accordance with present embodiments, the layered parent material 10 may be exfoliated to produce exfoliated layered parent material 12.

In some embodiments, the parent material may include layers that include nanosheets. As used herein, the term "nanosheets" refers to sheets having thickness of less than 100 nm. For example, nanosheets may have a thickness of about 0.5 nanometers to about 10 nanometers. In some embodiments, the layers of the parent material may be a single atom in thickness. By way of example, graphene nanosheets may be a single atom in thickness and may be isolated from a coke parent material by electrochemical exfoliation as described herein.

Suitable parent materials may include, but are not limited to, coke. Coke may be petroleum coke (petcoke) produced from the refining of petroleum and may include any coke microstructure with layers which may be electrochemically exfoliated to produce graphene. One example of a suitable coke is needle coke. Coke may also be produced from coal or tar, for example, from the destructive distillation of coal or tar in an oxygen free environment. Petroleum coke is typically produced in a coker unit from various heavy hydrocarbon feeds within the refinery. The coke that comes directly out of a coker unit is called green coke and generally contains 10-20% residual volatile hydrocarbons. Green coke may be further processed by calcining to remove volatiles and increase carbonization.

Depending on the application, petroleum cokes may be classified into three major grades: fuel coke, anode coke, and needle coke. A coker unit may produce any of these three grades depending on a number of factors, including the process temperature, duration of coking, and the quality of hydrocarbon feedstocks to the coking unit. Low grade vacuum residues produce the lowest value fuel coke as a by-product which is high in impurities (e.g., heavy metals, sulfur and nitrogen) and is generally used as fuel in electricity generation and cement kilns. Relatively higher-grade vacuum residues can be used to make anode grade coke with moderate value which are used in the aluminum industry. The highest quality and value needle coke can be produced by coking high quality aromatic feeds such as Fluid Catalytic Cracker decant oil which is used to produce high grade graphite electrodes for steel industry and in lithium battery anode applications. Anode coke has sponge or honey-comb like morphology and the least crystalline fuel coke is made of agglomerates of spherical "shots." Both these cokes have relatively low long-range order in their microstructure. Needle coke is highly crystalline and has the greatest long-range order in microstructure of all coke varieties. The high aromaticity and highly ordered structure makes needle coke particularly suitable for producing the highest quality exfoliated material. Needle coke may be further graphitized by heat treatment inert atmosphere at temperatures in excess of about 2500° C.

The parent materials may be provided in any suitable form, such as particulates or blocks, for example. Where used in particulate form, the particulates of the parent materials that are utilized in particular embodiments may have a wide variety of shapes and sizes. By way of example, the particulates may have a well-defined physical shape as well as an irregular geometry, including the physical shape of platelets, powders, shavings, fibers, flakes, ribbons, rods, strips, spheroids, beads, toroids, pellets, tablets, or any other physical shape. Often, the particulates may have a uniform average particle size. Alternatively, in other embodiments, the particulates may have a non-uniform average particle size. Particle sizes may be measured using any suitable technique, such as a scanning electron microscope or optical microscopy. Crystalline grain size of the parent material may impact exfoliation. For example, a parent material with a smaller lateral size may improve yield. Even further, a parent material with lower crystallinity and a smaller lateral size may show increased yield. In some embodiments, the parent material has a largest lateral dimension of about 50 µm to about 1,000 µm, about 50 µm to about 500 µm, about 100 µm to about 500 µm, about 100 µm to about 400 µm, about 100 µm to about 300 µm, or about 100 µm to about 200 µm. The largest lateral dimension refers to a largest dimension between two points on lateral dimensions of the parent material, and may be measured using any suitable technique, such as a scanning electron microscope or optical microscopy.

The exfoliated material resultant from the exfoliation techniques disclosed herein is dependent upon, for example, the particular parent material used. The coke parent material may be complex and non-uniform in composition such that, when exfoliated, may produce a plurality of distinct products. The process described herein separates the plurality of products into exfoliated nanosheets including graphene thereby allowing the production of graphene from coke. By way of example, the exfoliation may create exfoliated material by separation of layers of the parent material. Examples of exfoliated materials that may be produced with the present technique may include, but are not limited to, graphene, graphene oxide or graphite oxide. In some embodiments, the exfoliated material may include sheets, plates, layers, or the like, wherein at least a portion the sheets, plates, layers, etc. are physically separated from other sheets, plates, layers, etc.

In some embodiments, the exfoliated material includes graphene and the molar ratio of carbon to oxygen of the exfoliated material may be between about 30:1 and about 3:1. Alternatively, the exfoliated material includes graphene and the molar ratio of carbon to oxygen of the exfoliated material may be between about 1000:1 and about 3:1. For example, the molar ratio of carbon to oxygen of the exfoliated material may be between about 30:1 and about 10:1. By way of further example, the molar ratio of carbon to oxygen of the exfoliated material may be between about 30:1 and about 20:1.

In some embodiments, the exfoliated materials include exfoliated nanosheets. In some embodiments, the exfoliated nanosheets have a first major surface and a generally opposing second major surface, which can define the lateral dimensions of the exfoliated nanosheets. The largest lateral distance of the exfoliated nanosheets may be considered the two points on the first or the second major surface that are farthest away from one another. In some embodiments, the average largest lateral dimension of the exfoliated nanosheets may about 75 μm to about 300 μm or about 150 μm to about 300 μm, or about 200 μm to about 300 μm. The exfoliated nanosheets may also have a thickness, defined as the distance between the first major surface and the second major surface. In some embodiments, the exfoliated nanosheets may have an average thickness of about 0.5 nm to about 10 nm, about 2 nm to about 10 nm, or about 5 nm and to 10 nm. In some embodiments, the electrochemical exfoliation can provide exfoliated materials have a wide range of aspect ratios (length/thickness). For example, the exfoliated materials may have an aspect ratio (length/thickness) of about 100 to about 100,000 or of about 1,000 to about 20,000. In some embodiments, for example, with a petroleum-based feedstock, aspect ratio of the exfoliated material may be about 100 to about 1,000.

As described above, previous methods of exfoliating parent materials may be limited in how much parent material can be exfoliated. This is in contrast to the methods disclosed herein. In some embodiments, the compositions disclosed herein include greater than 75% exfoliated material by dried solid mass. In some embodiments, the compositions disclosed herein include between about 80% and about 99% exfoliated material by dried solid mass. In some embodiments, the compositions disclosed herein include between about 90% and about 99% exfoliated material by dried solid mass.

The electrochemical exfoliation methods described herein may generally include application of a voltage to a parent material under conditions which promote the exfoliation of the parent material. The voltage may be in a range of about 1 V to above 20 V. Alternatively from about 1 V to about 6 V, about 6V to about 12V, about 12V to about 20V, or any ranges therebetween. In general, higher voltages may correspond to quicker exfoliation of parent material which may allow for greater production per unit time of exfoliated material. Coke parent materials may require relatively higher voltages, as compared to graphite, to produce exfoliated product such as greater than about 10V or greater than about 12V.

The parent material may be exfoliated for any suitable period of time including from about 10 minutes to about 5 hours. Alternatively, from about 10 minutes to about 1 hour, about 1 hour to about 2 hours, about 2 hours to about 3 hours, about 3 hours to about 4 hours, about 4 hours to about 5 hours, or any ranges therebetween.

In some embodiments, the parent material may be pretreated before electrochemical exfoliation. The pre-treatment process may include physical and or chemical treatments to the parent material to produce a treated parent material. Some exemplary pre-treatments may include, but are not limited to, solvent washing, thermal treatment, acid treatment, centrifuging, and size reduction by pulverization, for example.

Solvent washing may include contacting the parent material with a suitable solvent to remove impurities from the parent material. A suitable solvent may include, without limitation dichloromethane. The parent material may be contacted with the solvent under vacuum filtration conditions to improve separation of the solvent and the parent material. In some embodiments, a second wash may be performed with an additional solvent such as water before or after contacting the parent material with the first solvent.

Thermal treatment may include exposing the parent material to elevated temperatures in the range of about 500° C. to about 3000° C. for a period of about 1 hour to about 24 hours. The thermal treatment may be carried out in an oxygen-free atmosphere or inert atmosphere. Acid treatment may include contacting the parent material with a suitable acid to increase hydrophobicity. Suitable acids may include nitric acid, for example. In some embodiments, the acid treatment may be performed in a sealed container at an elevated temperature in the range of about 40° C. to about 150° C. for a period of about 1 hour to about 12 hours. In particular embodiments, the parent material may be heated in an autoclave with nitric acid. After acid treatment the parent material may be rinsed with water or basic solution to remove and neutralize residual acid from the parent material. Other suitable techniques for increasing hydrophilicity, may include, but not limited to, functionalization with a hydrophilic moiety or oxygen plasma treatment. Examples of suitable hydrophilic moieties may include, but are not limited to, a hydroxyl group, a carbonyl group, an amine group, an epoxide group, an ether group, a diazonium group, and a carboxyl group. When the parent material is being rendered more hydrophilic, the electrolyte solution 30 (e.g., FIG. 3) should more readily wet a greater portion of the parent material expediting exfoliation.

The parent material may have a poly disperse particle size distribution containing relatively smaller nano-sized particles to relatively larger micron-sized particles. In some embodiments, the parent material may be centrifuged to separate the relatively smaller and relatively larger particles. Parent material may be suspended in a solvent, such as water, and centrifuged at conditions to separate the parent material. The pre-reaction centrifuge may produce a supernatant containing the relatively smaller particles and a sediment containing the relatively larger particles. The sediment containing the relatively larger particles may be used as the parent material in the electrochemical exfoliation processes described herein.

Figure 2:
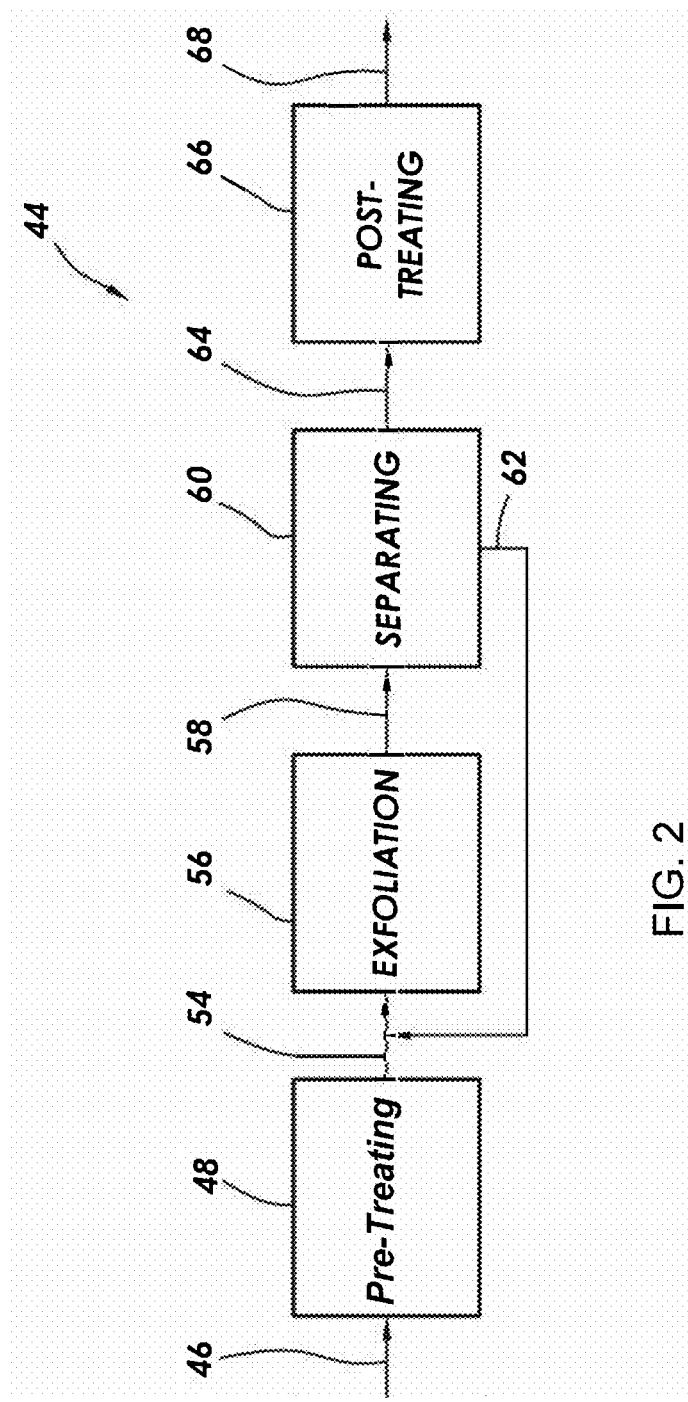
FIG. 2 is a flow diagram of a method for electrochemical exfoliation in accordance with some embodiments of the present disclosure.

FIG. 2 is a flowchart illustrating an example method 44 for exfoliation of a parent material in accordance with some embodiments. As illustrated, the method 44 may use a feed 46 of the parent material. The parent material used in this example method may include any of the parent materials previously described. In some embodiments, the feed 46 includes particulates of the parent material. In block 48, the method may include pretreating the feed 46 of the parent material. Pretreating of the feed 46 may include any of the described pre-treatments, including size reduction, solvent washing, thermal treatment, acid treatment, centrifuging, and combinations thereof. The treated parent material 54 be exfoliated using the reactor 16 (e.g., FIGS. 3-6) as described below. In block 56, exfoliated material may be produced by electrochemical exfoliation. However, it should be understood that the reaction may not be complete so that a mixture 58 of exfoliated material and unexfoliated particulates may be provided to block 60 for separating. In block 60, the exfoliated material may be separated from the unexfoliated particulates. The separating of block 60 may use any suitable technique. For example, the separation of the exfoliated material from the unexfoliated particulates may use sedimentation or centrifuging. In some embodiments, the mixture 58 may be washed, for example, with water, prior to the separating for removal of the electrolyte solution 30 (e.g., FIG. 3). In some embodiments, the mixture 58 may then be combined with a solvent and then introduced into a separator for sedimentation, for example, with the sediment including unexfoliated parent material with supernatant including exfoliated material. Choice of solvent may impact separation efficiency. Suitable solvents may include, but are not limited to, water, ethanol, acetone, isopropanol, n-methyl-2-pyrrolidone, dimethylformamide, and chloroform, among others. Some embodiments may include a solvent that includes water and ethanol. The volume fraction of the ethanol in the solvent may be about 0% to about 90%, about 5% to about 80%, about 5% to about 60%, about 5% to about 50%, about 10% to about 50%, about 10% to about 40%, about 10% to about 40%, or about 20% to about 30%. A recycle 62 of the unexfoliated particulates separated from the exfoliated material may be recycled to the block 56 for further exfoliation. For instance, in the illustrated embodiment, the recycle 62 is combined with sediment parent material 54, and the combined materials are fed to block 56. An exfoliated material 64 separated from the unexfoliated particulates may then be provided to block 66 for post-treatment to produce a post-treated material 68. Post-treatment in block 66 may include, for example, dispersion, particle size separation, drying, annealing, and combinations thereof.

Dispersion of the exfoliated material 64 may be desired as aggregates of the exfoliated material may have formed. An example technique for dispersion may include shear mixing. In some embodiments, the dispersed and exfoliated material 64 may be dried, for example, freeze dried. Exfoliated material produced in block 56 may contain unreacted materials, smaller non-graphitic material, and electrochemically exfoliated graphene product.

Exfoliated material 64 may be subjected to multi-stage centrifuging to separate the components of the exfoliated material by size. A multi-stage centrifuging process allows for recovery of exfoliated nanosheets, including graphene, from the exfoliated material. A first centrifuging stage may be performed at an RPM ranging from about 1000 RPM to about 3000 RPM for a period of about 5 minutes to about 15 minutes. The first centrifugation of the exfoliated product may separate the largest particles into a sediment which may be discarded or recycled back to the exfoliation process. The first supernatant contains the product exfoliated nanosheets.

The first supernatant may be subjected to further centrifuging where the second centrifuging may be performed at an RPM ranging from about 3000 RPM to about 6000 RPM for a period of about 15 minutes to about 25 minutes. The second sediment contains the electrochemically exfoliated graphene product. In some embodiments, the exfoliated material may be subjected to continuous flow centrifugation to separate the electrochemically exfoliated graphene product.

The electrochemically exfoliated graphene product may be annealed at elevated temperature to increase electrical conductivity, for example in a tube furnace. Annealing may be carried out at a temperature of about 200° C. to about 3000° C. Alternatively, the electrochemically exfoliated graphene product may be annealed at a temperature in a range of from about 200° C. to about 500° C., about 500° C. to about 800° C., about 800° C. to about 1100° C., about 1100° C. to about 1500° C., about 1500° to about 2000° C., about 2000° C. to about 2500° C., about 2500° C. to about 3000°, or any ranges therebetween. The annealing step may be performed for a period of about 30 minutes to about 24 hours. Alternatively, about 1 hour to about 4 hours, about 4 hours to about 8 hours, about 8 hours to about 12 hours, about 12 hours to about 16 hours, about 16 hours to about 20 hours, about 20 hours to about 24 hours, or any ranges therebetween. As will be shown in the Examples, the annealing process may raise the conductivity of the exfoliated graphene product significantly. After annealing the electrochemically exfoliated graphene product may have a conductivity in a range of about 50 Siemens/m (S/m) to about 500 S/m or greater. Alternatively, the electrochemically exfoliated graphene product may have a conductivity in a range of about 0.1 Siemens/m (S/m) to about 1000 S/m or greater, about 1000 S/m to about 5000 S/m or greater, or about 5000 S/m to about 10,000 S/m or greater. After annealing, the electrochemically exfoliated graphene product may have an increase in conductivity from about 2 times to about 10 times, about 10 times to about 100 time, or greater. The conductivity of the electrochemically exfoliated graphene may be a function of annealing time and temperature as well as the initial conductivity of the parent material.

Figure 3:
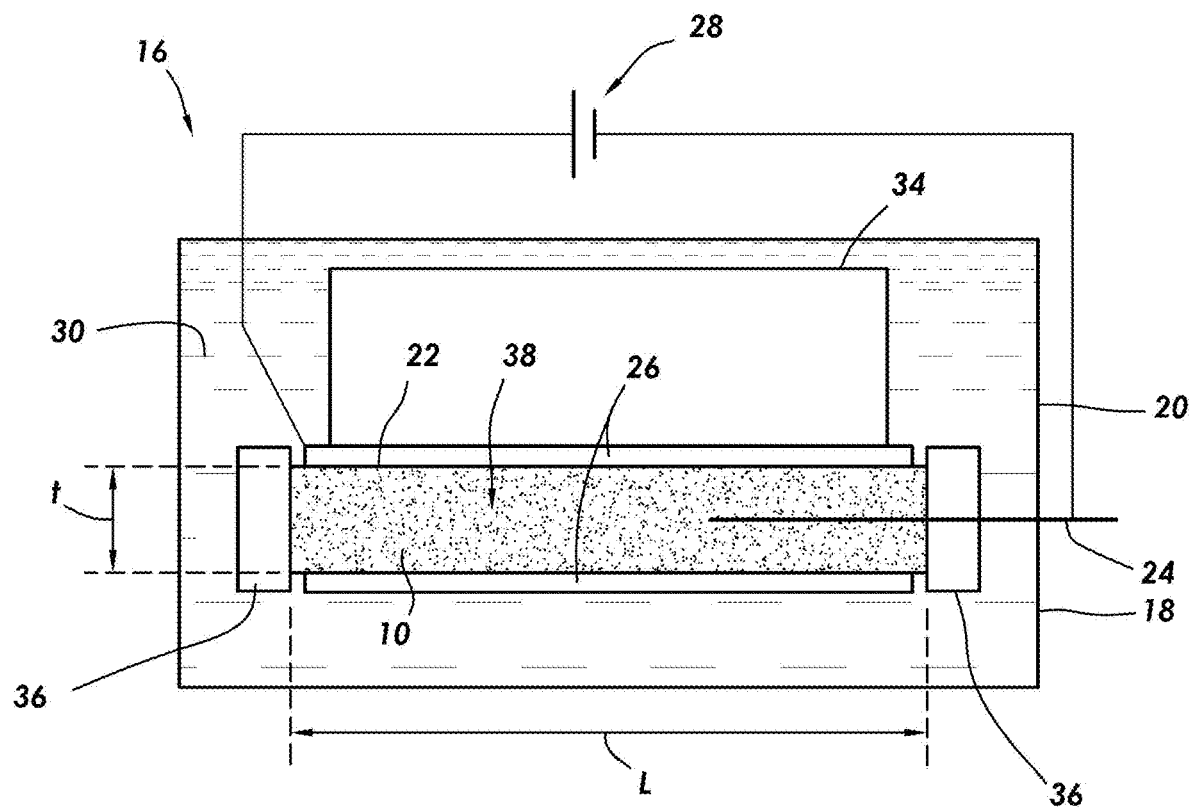
FIG. 3 is a schematic illustration of a reactor for electrochemical exfoliation in accordance with some embodiments of the present disclosure.

FIG. 3 illustrates a reactor 16 for electrochemical exfoliation of a parent material in accordance with example embodiments. In the illustrated embodiment, the reactor 16 includes a container 18, a porous chamber 22, a working electrode 24, a pair of counter electrodes 26, and an electrical power source 28. As illustrated, the container 18 may contain an electrolyte solution 30 in which the porous chamber 22 may be placed. The parent material 10 may be positioned in the porous chamber 22 on which a pressure may be applied by a pressure source 34 to compress the parent material 10. While particulates of the parent material 10 are shown, it should be understood that other forms of the parent material 10 may be used in the reactor 16 for electrochemical exfoliation. Electrical power source 28 may be used to apply a voltage to the parent material 10 for exfoliation of the parent material, for example, a voltage of about 1 V to above 20 V or about 5 V to about 20 V.

In some embodiments, the electrolyte solution 30 includes an electrolyte dissolved in a solvent. Examples of suitable electrolytes may include, but are not limited to, sodium sulfate, potassium sulfate, ammonium sulfate, sulfuric acid, nitric acid, phosphoric acid, sodium nitrate, sodium phosphate, potassium phosphate, ammonium phosphate, sodium nitrate, potassium nitrate, ammonium nitrate, sodium perchlorate, potassium perchlorate, ammonium perchlorate, sodium chloride and combinations thereof. In some embodiments, the electrolyte solution 30 may include lithium ions. In some embodiments, the solvent may include water. Alternatively, examples of suitable solvents may include an organic solvent such as dichloromethane, dichlorobenzene, diphenyl ether, dimethylformamide, dimethylsulfoxide, n-methylpyrrolidone, and combinations thereof. One of ordinary skill in the art, with the benefit of this disclosure, should be able to select an appropriate electrolyte solution for a particular application.

In some embodiments, the porous chamber 22 may be placed in the electrolyte solution 30. The porous chamber 22 may be oriented in the electrolyte solution 30 in any suitable manner, for example, the porous chamber 22 may be oriented with its longitudinal axis extending in a generally horizontal direction or a generally vertical direction. As used herein, the terms "generally horizontally" and "generally vertically" reference orientations that are within plus or minus about 5 degrees from horizontal or vertical, respectively. However, it should be understood that the porous chamber 22 may also be oriented with its longitudinal axis being angled in the range of about 5 degrees to about 85 degrees from horizontal. By placement in a generally horizontal direction, a weight may be used as the pressure source 34, for example, relying on gravity for application of the pressure. The porous chamber 22 may be elongated such that it has a relatively high aspect ratio (length to width) (e.g., 3:1, 5:1, 10:1 or greater). In some embodiments, the porous chamber 22 may be generally tubular or otherwise configured for holding the parent material 10.

The porous chamber 22 should hold the parent material 10 while allowing the electrolyte solution 30 to pass through, but not the parent material 10 or exfoliated material. In some embodiments, the porous chamber 22 is further configured to allow the electrolyte solution 30 to pass through without allowing the parent material (or exfoliated material) to pass through. By way of example, the pore size of the porous chamber 22 may be selected to allow passage of the electrolyte solution with passage of the parent material (or exfoliated material) therethrough.

In some embodiments, the porous chamber 22 includes pores configured to exclude the parent material 10. In some embodiments, the porous chamber 22 includes pores having pore sizes smaller than an average smallest lateral dimension of the parent material 10 and the exfoliated material. As used herein, a smallest lateral dimension of the parent material 10 refers the smallest distance between two points on one of the first major surface or second major surface. First major surfaces and second major surfaces are discussed further herein with respect to largest lateral dimensions of exfoliated materials. Non-limiting examples of suitable pore sizes for the porous chamber 22 include, but are not limited to, pores having pore sizes between about 10 nm and about 10 μm. In an embodiment, the porous chamber 22 includes pores having pore sizes of about 25 nm to about 75 nm.

The porous chamber 22 may include any suitable chambers for a particular application. Examples of suitable materials for the porous chamber 22 may include, but are not limited to, a porous polymeric material, a porous metallic material, porous glass, a woven porous material, a non-woven porous material, and combinations thereof. In an embodiment, the porous chamber 22 includes a porous material chosen from hydrophilic polytetrafluoroethylene (PTFE), hydrophobic PTFE, glass, cellulose, polycarbonate, cellulose acetate, nylon, cellulose esters, cotton cloth, and combinations thereof. A particular example includes a porous bag. In one particular embodiment, the porous chamber 22 is a dialysis bag. In some embodiments, the porous chamber 22 may include a support structure (e.g., frame 40 shown on FIG. 4) disposed therein. The frame 40 provides a controlled shape for the porous chamber 22 containing the parent material 10 so pressure can be applied along the bed of the parent material, for example, to prevent the parent material 10 from moving outwards away from the applied pressure.

As illustrated in FIG. 3, embodiments may further include one or more seals 36 on the porous chamber 22. In the illustrated embodiment, seals 36 are positioned on either end of the porous chamber 22. By way of example, the seals 36 may close open ends of the porous chamber 22 to seal the parent material 10 in the porous chamber 22. Any suitable seals 36 may be used. Examples of suitable seals 36 may include, but are not limited to, clamps, adhesives, and interlocking features (e.g., grooves/ridges), among others.

As previously, described, the porous chamber 22 may hold parent material 10 in accordance with present embodiments. In the illustrated embodiments, the parent material 10 comprises particulates arranged to form a bed 38 of the parent material 10. As illustrated, the bed 38 may have a length L and a thickness t. While not shown on FIG. 3, the bed 38 may also have a width w. In accordance with present embodiments, the length L, thickness t, and width w of the bed 38 may be selected to increase a yield of the exfoliated material. By way of example, selection of an appropriate length L, thickness t, and/or width w of the bed 38 can improve the yield of the exfoliated material produced in the reactor 16, thus providing reactor 16 scalability. In some embodiments, the yield of the reactor may be about 10% or greater, for example, about 15% or greater, about 20% or greater, about 30% or greater, about 40% or greater, or about 50% or greater. Design of the reactor 16 may also provide improved kinetics of the electrochemical exfoliation.

By way of example, the bed 38 of the parent material 10 may have length L of about 50 millimeters to about 1 meter, or about 50 millimeters to about 500 millimeters, or about 50 millimeters to about 300 millimeters, or about 50 millimeters to about 500 millimeters, or about 50 millimeters to about 500 millimeters, or about 50 millimeters to about 300 millimeters, or about 50 millimeters to about 200 millimeters, or about 100 millimeters to about 500 millimeters, or about 100 millimeters to about 400 millimeters, or about 100 millimeters to about 300 millimeters, or about 100 millimeters to about 200 millimeters, or about 200 millimeters to about 500 millimeters, or about 200 millimeters to about 400 millimeters, or about 200 millimeters to about 300 millimeters. By way of further example, the bed 38 of the parent material 10 may have thickness t of about 0.5 millimeters to about 10 millimeters, or about 1 millimeter to about 5 millimeters, or about 2 millimeters to about 5 millimeters, or about 3 millimeters to about 5 millimeters, or about 4 millimeters to about 5 millimeters, or about 1 millimeters to about 4 millimeters, or about 2 millimeters to about 4 millimeters, or about 3 millimeters to about 4 millimeters. By way of further example, the bed 38 of the parent material 10 may have width w of about 0.5 millimeters to about 5 millimeters, or about 1 millimeter to about 5 millimeters, or about 2 millimeters to about 5 millimeters, or about 3 millimeters to about 5 millimeters, or about 4 millimeters to about 5 millimeters, or about 1 millimeters to about 4 millimeters, or about 2 millimeters to about 4 millimeters, or about 3 millimeters to about 4 millimeters Those of ordinary skill in the art, with the benefit of this disclosure, should be able to select appropriate dimensions for the bed 38 that would be suitable for a particular application.

The parent material 10 may be compressed into the bed 38 by the pressure source 34. The pressure source 34 should maintain sufficient pressure on the bed 38 to maintain conditions necessary to generate the exfoliated material. By way of example, the pressure on the bed 38 should compress the parent material 10 so that electrical connections can be maintained in the bed 38 during exfoliation. The pressure source 34 can apply the pressure to the bed 38 through the porous chamber 22. As illustrated, at least one of the counter electrodes 26 and the porous chamber 22 may be disposed between the pressure source 34 and the bed 38 of the parent material 10. In the illustrated embodiment, the pressure source 34 applies pressure along a longitudinal length of the porous chamber 22. In some embodiments, the pressure source 34 may apply pressure substantially along a longitudinal length of the porous chamber 22. For example, the pressure may be applied along at least 50%, 60%, 70%, 80%, 90%, 95%, or 98% of the length of the porous chamber 22.

The pressure applied by the pressure source 34 may be a constant or variable pressure. Examples of suitable constant pressure sources may include, but are not limited to, weights and springs. In addition, springs and weights may also be configured as variable pressure sources. Any suitable pressure may be applied to the bed 38. For example, the suitable pressures may be about 0.1 kPa to about 1 MPa or about 1 kPa to about 10 kPa. Those of ordinary skill in the art, with the benefit of this disclosure, should be able to select an appropriate pressure that would be suitable for a particular application.

In the illustrated embodiments, the reactor 16 has an electrical system that includes a working electrode 24, a pair of counter electrodes 26, and an electrical power source 28. As previously described, the electrical power source may be used to apply a voltage to the parent material 10 for exfoliation of the parent material. In the illustrated embodiment, an electrical circuit may be completed by the pair of counter electrodes 26 that includes the working electrode 24, the parent material 10, the electrolyte solution 30, and the electrical power source 28. Current may flow from the working electrode 24 through the parent material 10 and the electrolyte solution 30 to the pair of counter electrodes 26.

As illustrated, the working electrode 24 may at least partially extend into the porous chamber 22. For example, the working electrode 24 may extend into and be disposed in the parent material 10 in the porous chamber 22. As illustrated, the working electrode may also be disposed in the electrolyte solution 30. For example, the working electrode 24 may be partially or completely submerged in the electrolyte solution 30.

The working electrode 24 may be made of any suitable material for facilitating the exfoliation of the parent material. During operation, a positive voltage may be applied to the working electrode 24 such that a potential difference is provided between the pair of counter electrodes 26 and the working electrode. Examples of suitable materials may include, but are not limited to, graphite, noble metals, copper, and stainless steel. Examples of suitable noble metals may include, but are not limited to, platinum, palladium, iridium, gold, and combinations thereof. In some embodiments, the working electrode 24 may be a graphite foil or a graphite rod. In some embodiments, the working electrode 24 may be the same material as the parent material. In some embodiments, the working electrode 24 and the pair of counter electrodes 26 may be the same material as the parent material. One of ordinary skill in the art with the benefit of this disclosure should be able to select an appropriate material for the working electrode 24 for a particular application.

As illustrated, the pair of counter electrodes 26 may be disposed in the electrolyte solution 30. For example, the pair of the counter electrodes 26 may be partially or completely submerged in the electrolyte solution 30. In accordance with present embodiments, the pair of counter electrodes 26 may be positioned proximate to the bed 38 of the parent material 10. By way of example, the pair of counter electrodes 26 may be positioned within about 10 cm of the bed 38, about 5 cm of the bed 38, or about 2 cm of the bed 38, or closer. In some embodiments, at least one electrode of the pair of counter electrodes 26 may be positioned between the pressure source 34 and the porous chamber 22. In some embodiments, at least one electrode of the pair of counter electrodes 26 may be in contact with the porous chamber 22. In some embodiments, at least one electrode of the pair of counter electrodes 26 may be positioned on top of the porous chamber 22 while the other electrode of the pair of counter electrodes 26 may be positioned under the porous chamber 22.

In the illustrated embodiments, each of the pair of counter electrodes 26 extends along a longitudinal length of the porous chamber 22. As illustrated, the pair of counter electrodes 26 may be disposed on opposite sides of the porous chamber 22 from one another with each of the pair of counter electrodes extending along a length of the porous chamber 22. In some embodiments, at least one electrode of the pair of counter electrodes 26 may extend substantially along a longitudinal length of the porous chamber 22. For example, at least one electrode of the pair of counter electrodes 26 may extend along at least 50%, 60%, 70%, 80%, 90%, 95%, or 98% of the length of the porous chamber 22. As illustrated, both electrodes of the pair of counter electrodes 26 may extend substantially along a longitudinal length of the porous chamber 22.

The pair of counter electrodes 26 may be made from any suitable material for completion of the electric circuit. During operation, a negative voltage may be applied to the pair of counter electrodes 26, for example, so that pair of counter electrodes 26 do not take part in the reduction reaction. Examples of suitable materials may include, but are not limited to, noble metals, copper, steel (e.g., stainless steel). In some embodiments, the pair of counter electrodes 26 may be copper mesh. Examples of suitable noble metals may include, but are not limited to, platinum, palladium, iridium, gold, and combinations thereof. In some embodiments, the pair of counter electrode 26 may be the same material as the parent material. One of ordinary skill in the art with the benefit of this disclosure should be able to select an appropriate material for the pair of counter electrodes 26 for a particular application.

In accordance with some embodiments, the electrical power source 28 may apply a potential bias to the parent material 10. The electrical power source 28 may be electrically coupled to the working electrode 24 and the pair of counter electrodes 26. In the illustrated embodiments, an electric circuit is provided that include the working electrode 24, the pair of counter electrodes 26, the electrical power source 28, the electrolyte solution 30, and the parent material 10. The electrical power source 28 may be configured to produce any suitable current. For example, the electrical power source 28 may be configured to produce alternative current or direct current. In particular embodiments, the electrical power source 28 may be configured to produce alternating current that is sinusoidal or alternating current with a constant voltage.

The electrical power source 28 may be configured to produce electrical power sufficient to generate exfoliated material from the parent material 10. In some embodiments, the electrical power source 28 is configured to apply a potential bias of about 1 V to above 20 V to the parent material 10. In an embodiment, the electrical power source 28 is configured to apply a potential bias of about 1 V to about 20 V to the parent material 10. By way of example, the electrical power source 28 is configured to apply a potential bias of about 12 V or greater to the parent material 10.

With continued reference to FIG. 3, an example method for use of the reactor 16 for exfoliation of the parent material will now be described in more detail. In accordance with some embodiments, the parent material 10 may be placed into the porous chamber 22. The porous chamber 22 may then be sealed, for example, at one or more ends to seal the parent material into the porous chamber 22. The porous chamber 22 may then be placed into the container 20 where the pressure source 34 may then be used for application of pressure along a length of the porous chamber 22, thus compressing the parent material 10. The working electrode 24 may also be inserted into the porous chamber 22 such that is may be disposed in the parent material 10. It should be understood that the working electrode 24 may inserted into the porous chamber 22 at any suitable time. For example, the working electrode 24 may be inserted before or after addition of the parent material 10 and also before or after placement of the porous chamber 22 into the container. The working electrode 24, the pair of counter electrodes 26, and the porous chamber 22 may then be placed in the electrolyte solution 30. In some embodiments, the electrolyte solution 30 may be in the container 20 when the porous chamber 22 is inserted. However, the electrolyte solution 30 may also be introduced into the container 20 after the porous chamber.

To initiate electrochemical exfoliation of the parent material in the porous chamber 22, the electrical power source 28 may be used to apply a potential bias to the parent material 10. Ionic groups in the electrolyte solution 30 may intercalate into the parent material, thus, for example, increasing the inter-layer distance and cause the parent material 10 to expand, for example, generally upwards. In some embodiments, as the distance is increased, layers of the parent material may be separated. In this manner, exfoliated material may be produced by the electrochemical exfoliation. In particular embodiments, the electrochemical exfoliation can expand a coke parent into exfoliated sheets that includes graphene.

Figure 4:
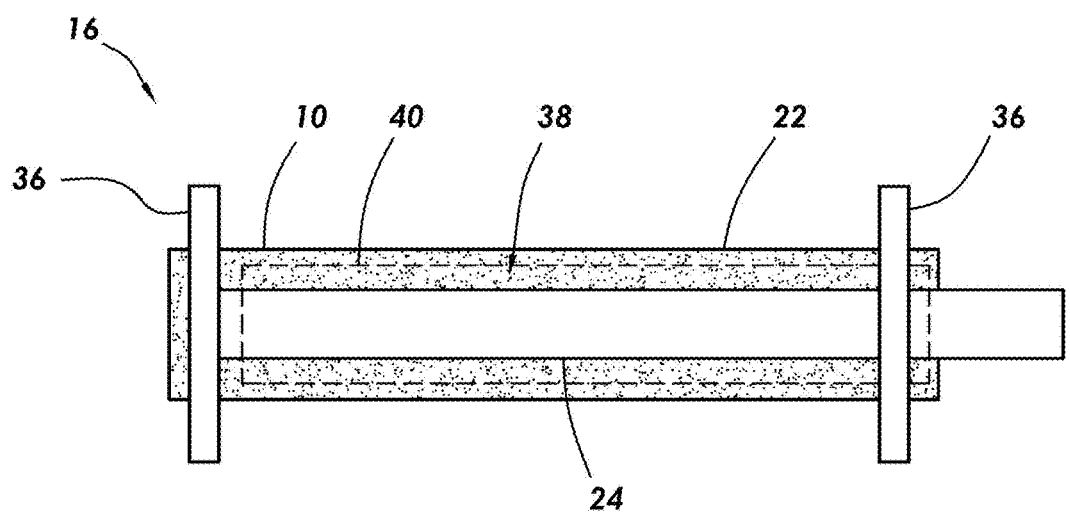
FIG. 4 is a top down view of the reactor of FIG. 3 in accordance with some embodiments of the present disclosure.

FIG. 4 is a top view of reactor 16 in accordance with some embodiments. For illustrative purposes, the container 20, pair of counter electrodes 26, and pressure source 34 are not shown. As illustrated, the parent material 10 may be disposed in the porous chamber 22. The parent material 10 may be compressed into a bed 38 of the parent material 10. The working electrode 24 may extend into the porous chamber 22 such that the working electrode 24 is in the bed 38 of the parent material 10. Seals 36 may be positioned at either end of the porous chamber 22 for securing the parent material 10 in the porous chamber 22.

In the illustrated embodiment, the porous chamber 22 further includes a frame 40. As illustrated, the frame 40 may be disposed in the porous chamber 22. Among other things, the frame 40 can provide structural support for the porous chamber 22.

Figure 5:
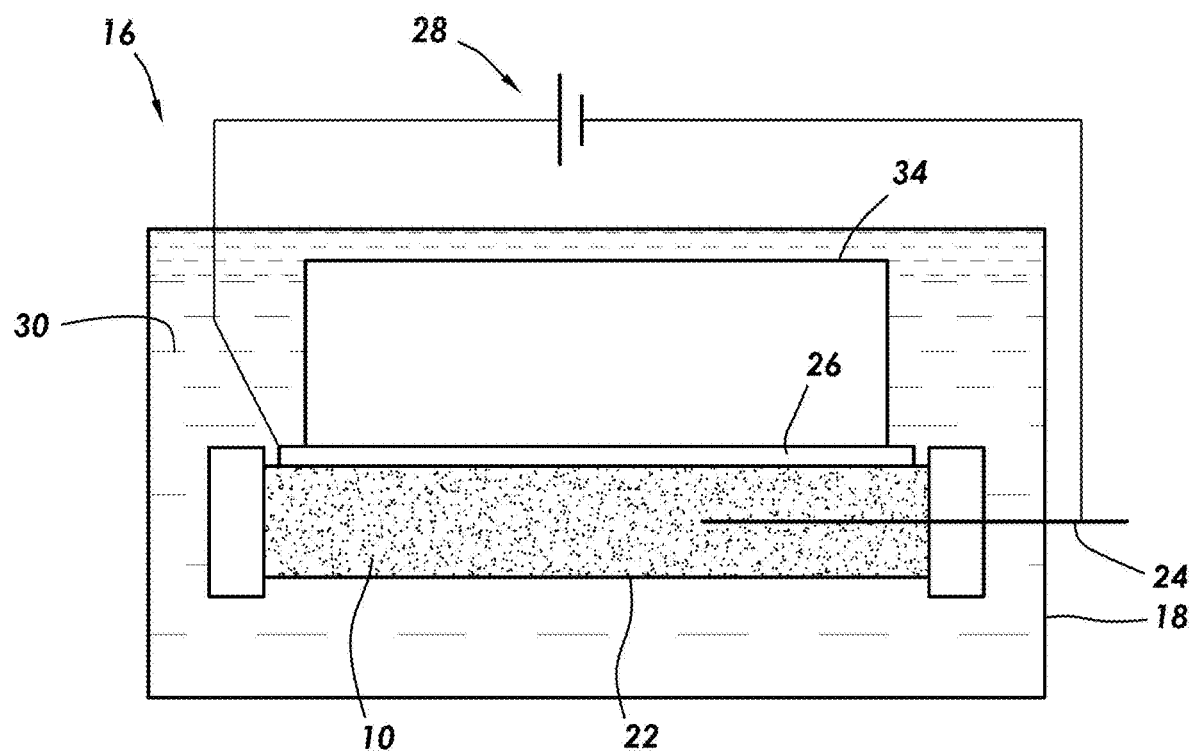
FIG. 5 is a schematic illustration of a reactor for electrochemical exfoliation in accordance with alternative embodiments of the present disclosure.

FIG. 5 is a schematic illustration of an alternative embodiment of the reactor 16 in accordance with some embodiments. The illustrated embodiment is similar to the reactor 16 of FIG. 3. As illustrated, the reactor 16 includes a container 18, a porous chamber 22, a working electrode 24, and an electrical power source 28. However, the embodiment of FIG. 5 includes a counter electrode 26 on only one side of the porous chamber 22. As illustrated, the container 18 may contain an electrolyte solution 30 in which the porous chamber 22 may be placed. Parent material 10 may be positioned in the porous chamber 22 on which a pressure may be applied by a pressure source 34 to compress the parent material 10. Electrical power source 28 may be used to apply a voltage to the parent material 10 for exfoliation of the parent material.

The counter electrode 26 may be disposed in the electrolyte solution 30. For example, the counter electrode 26 may be partially or completely submerged in the electrolyte solution 30. In accordance with present embodiments, the electrode 26 may be positioned proximate to the bed 38 of the parent material 10. In illustrated embodiment, the counter electrode 26 may be positioned between the pressure source 34 and the porous chamber 22. In some embodiments, the counter electrode 26 may be in contact with the porous chamber 22. In some embodiments, the counter electrode 26 may be positioned on the porous chamber 22.

In the illustrated embodiment, the counter electrode 26 extends along a longitudinal length of the porous chamber 22. In some embodiments, the counter electrode 26 may extend substantially along a longitudinal length of the porous chamber 22. For example, the counter electrode may extend along at least 50%, 60%, 70%, 80%, 90%, 95%, or 98% of the length of the porous chamber 22.

The counter electrode 26 may be made from any suitable material for completion of the electric circuit. During operation, a negative voltage may be applied to the counter electrode 26, for example, so that the counter electrode 26 does not take part in the reduction reaction. Examples of suitable materials may include, but are not limited to, noble metals, copper, steel (e.g., stainless steel). In some embodiments, the counter electrode 26 may be copper mesh. Examples of suitable noble metals may include, but are not limited to, platinum, palladium, iridium, gold, and combinations thereof. In some embodiments, the counter electrode 26 may be the same material as the parent material. One of ordinary skill in the art with the benefit of this disclosure should be able to select an appropriate material for the counter electrode 26 for a particular application.

Figure 6:
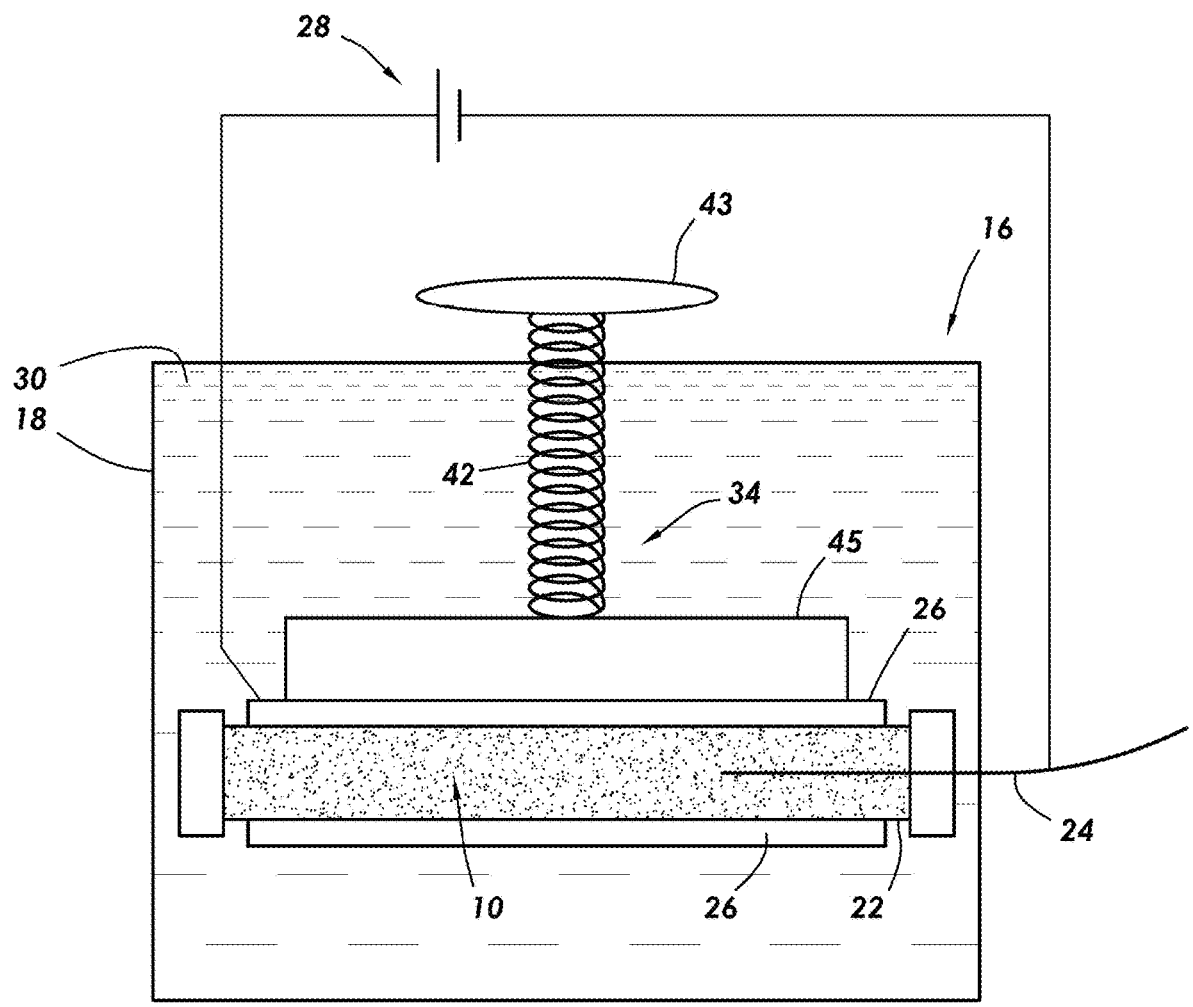
FIG. 6 is a schematic illustration of a reactor for electrochemical exfoliation in accordance with alternative embodiments of the present disclosure.

FIG. 6 is a schematic illustration of an alternative embodiment of the reactor 16 in accordance with some embodiments. The illustrated embodiment is similar to the reactor 16 of FIG. 3. As illustrated, the reactor 16 includes a container 18, a porous chamber 22, a working electrode 24, a pair of counter electrodes 26, and an electrical power source 28. Exemplary embodiments of the reactor 16 also include a pressure source 34. In the illustrated embodiment, the pressure source 34 includes a spring 42 for applying pressure to the parent material 10 in the porous chamber 22. As illustrated, a fixture 43 may support and position the spring 42. The spring 42, for example, may bias a plate 45 that applies pressure to the porous chamber 22. As illustrated, the container 18 may contain an electrolyte solution 30 in which the porous chamber 22 may be placed. Parent material 10 may be positioned in the porous chamber 22 on which a pressure may be applied by the pressure source 34 to compress the parent material 10. Electrical power source 28 may be used to apply a voltage to the parent material 10 for exfoliation of the parent material.

Accordingly, the preceding description describes examples of processes and systems for electrochemical exfoliation of parent materials, such as coke. The processes and systems disclosed herein may include any of the various features disclosed herein, including one or more of the following embodiments.

Embodiment 1. A reactor for electrochemical exfoliation, comprising: an container configured to hold an electrolyte solution; a porous chamber, wherein the porous chamber is configured to hold a parent material comprising coke, and wherein the electrolyte solution is in fluid communication with the parent material; a pressure source positioned to apply a pressure to the porous chamber to thereby compress the parent material in the porous chamber; a first counter electrode; a working electrode; and an electrical power source in electrical communication with the first counter electrode and the working electrode.

Embodiment 2. The reactor of embodiment 1, wherein the porous chamber comprises pores having pore sizes between about 10 nm and about 10 μm.

Embodiment 3. The reactor of any of embodiments 1-2, coke comprises particulates of needle coke.

Embodiment 4. The reactor of any of embodiments 1-3, wherein the working electrode extends at least partially into the porous chamber and/or wherein the first counter electrode is positioned in the electrolyte solution along the length of the porous chamber.

Embodiment 5. The reactor of any of embodiments 1-4, wherein the pressure source is configured to apply pressure along at least 90% of the length of the porous chamber, wherein the pressure source comprises at least one of a weight or a spring.

Embodiment 6. The reactor of any of embodiments 1-5, wherein the first counter electrode is positioned between the pressure source and the porous chamber, wherein each of the first counter electrode and the porous chamber are positioned generally horizontally in the electrolyte solution, and further comprising a second counter electrode, wherein the first and the second counter electrodes are in contact with the porous chamber, and wherein the first and the second counter electrodes are disposed on opposite sides of the porous chamber from one another.

Embodiment 7. A method of electrochemical exfoliation, comprising: electrochemically exfoliating a parent material comprising coke, wherein the electrochemically exfoliating comprises introducing the parent material into a porous chamber, applying pressure to the porous chamber to thereby compress the parent material in the porous chamber, and applying a potential bias to the parent material while at least a portion of the parent material is in contact with an electrolyte solution to produce a mixture of exfoliated material and unexfoliated parent material, wherein the exfoliated material comprises exfoliated graphene; and separating at least a portion of the exfoliated material from the unexfoliated parent material.

Embodiment 8. The method of embodiment 7, wherein the coke comprises needle coke.

Embodiment 9. The method of any of embodiments 7-8, wherein the potential bias is about 12 volts or greater.

Embodiment 10. The method of any of embodiments 7-9, wherein the electrolyte solution comprises ammonium sulfate.

Embodiment 11. The method of any of embodiments 7-10, wherein the separating at least a portion of the exfoliated material from the unexfoliated parent material comprises: centrifuging the exfoliated material at conditions sufficient to separate a first sediment and a first supernatant comprising the exfoliated graphene; and centrifuging the first supernatant at conditions sufficient to separate a second supernatant and a second sediment comprising the exfoliated graphene.

Embodiment 12. The method of any of embodiments 11, wherein the exfoliated material is centrifuged at about 1000 RPM to about 3000 RPM for a period of about 5 minutes to about 15 minutes.

Embodiment 13. The method of embodiment 11, wherein the first supernatant is centrifuged at RPM ranging from about 3000 RPM to about 6000 RPM for a period of about 15 minutes to about 25 minutes.

Embodiment 14. The method of any of embodiments 7-13, wherein the separating at least a portion of the exfoliated material from the unexfoliated parent material comprises continuous flow centrifuging.

Embodiment 15. The method of any of embodiments 7-14, further comprising annealing at least a portion of the exfoliated graphene at a temperature of about 200° C. to about 3000° C.

Embodiment 16. The method of any of embodiments 7-15, wherein the step of annealing is performed for a period of about 30 minutes to about 24 hours.

Embodiment 17. The method of any of embodiments 7-16, wherein the exfoliated graphene after annealing has a conductivity of about 50 S/m to about 10,000 S/m.

Embodiment 18. The method of any of embodiments 7-17, further comprising contacting the parent material with a solvent and an acid prior to the step of electrochemically exfoliating.

Embodiment 19. The method of embodiment 18, wherein the acid is nitric acid.

Embodiment 20. The method of any of embodiments 7-19, wherein graphene and the molar ratio of carbon to oxygen of the exfoliated material is between about 1000:1 and about 3:1

EXAMPLES

To facilitate a better understanding of the present disclosure, the following example of certain aspects of some embodiments are given. In no way should the following examples be read to limit, or define, the entire scope of the disclosure.

Example 1

Petroleum coke in the form of needle coke fines was used as a parent material for producing exfoliated graphene. In these tests, a pretreatment process was performed by washing the needle coke fines with dichloromethane (DCM) and deionized water under vacuum filtration. After washing, the needle coke fines were treated with 6M nitric acid at 1 mg/ml concentration in a stainless-steel autoclave at 120° C. for 4 hours. After treating with nitric acid, the treated needle coke fines were dried overnight at 100° C. on a hotplate.

The resultant treated needle coke fines have a polydisperse particle size distribution. The sample was found to contain relatively large particles in the range of 30-50 micrometers as well as a fraction of relatively smaller particles. The treated needle coke fines were added to water in an amount of 5 mg/ml and centrifuged at 4000 RPM for 10 minutes. The supernatant after centrifuging was found to contain a majority of the unwanted relatively smaller particles and the sediment from centrifuging contained the relatively larger particles of treated needle coke.

The treated needle coke fines from the centrifuge sediment were selected for electrochemical exfoliation. About 7.5 grams of treated needle coke fines were added to and compacted in a dialysis bag and clipped at both ends. A platinum wire was inserted in the dialysis bag as a working electrode and copper foil was wrapped around the dialysis bag as a counter electrode. A weight was applied to the dialysis tube and the dialysis bag was submerged in 2 liters of a 0.1 M solution of ammonium sulfate $(NH_4)_2SO_4$. A power supply outputting 12 volts was connected to the platinum wire and the copper foil to begin electrochemical exfoliation. The electrochemical exfoliation was carried out for a period of 2 hours. The product was removed from the dialysis bad and washed in deionized water to remove remaining ammonium sulfate.

The resultant washed exfoliated product contains unreacted material, smaller non-graphitic materials, and the electrochemically exfoliated graphene product. To separate these components the washed exfoliated product was mixed with 10% ethanol solution at 5 mg/ml and centrifuged at 2000 RPM for 10 minutes. In the first centrifuging, the unreacted larger material is collected as the sediment and the smaller non-graphitic material as well as electrochemically exfoliated graphene product remain in the supernatant. The supernatant from the first centrifuging was separated from the first sediment and subjected to a second centrifuging at 5000 RPM for 20 minutes. The sediment from the second centrifuging contains the product electrochemically exfoliated graphene.

Figure 7:
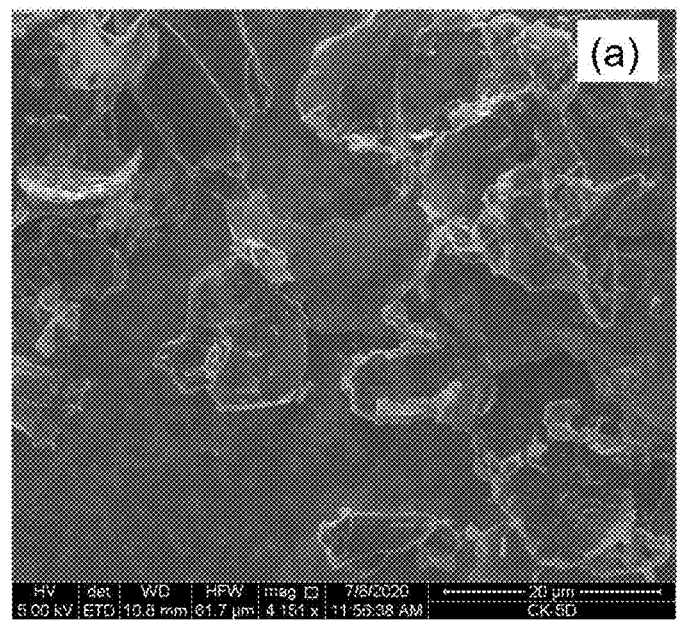
FIG. 7 is a scanning electron microscope (SEM) image of electrochemically exfoliated graphene produced from electrochemical exfoliation in accordance with some embodiments of the present disclosure.
Figure 8:
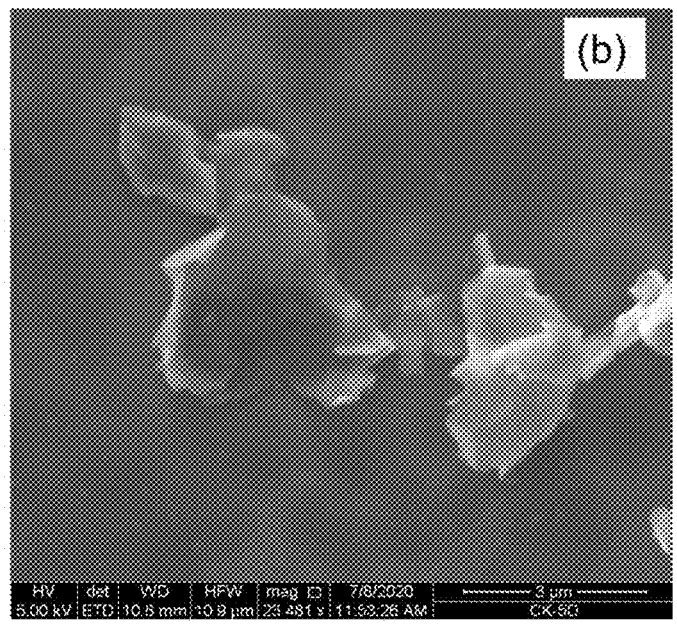
FIG. 8 is a scanning electron microscope (SEM) image of electrochemically exfoliated graphene produced from electrochemical exfoliation in accordance with some embodiments of the present disclosure.
Figure 9:
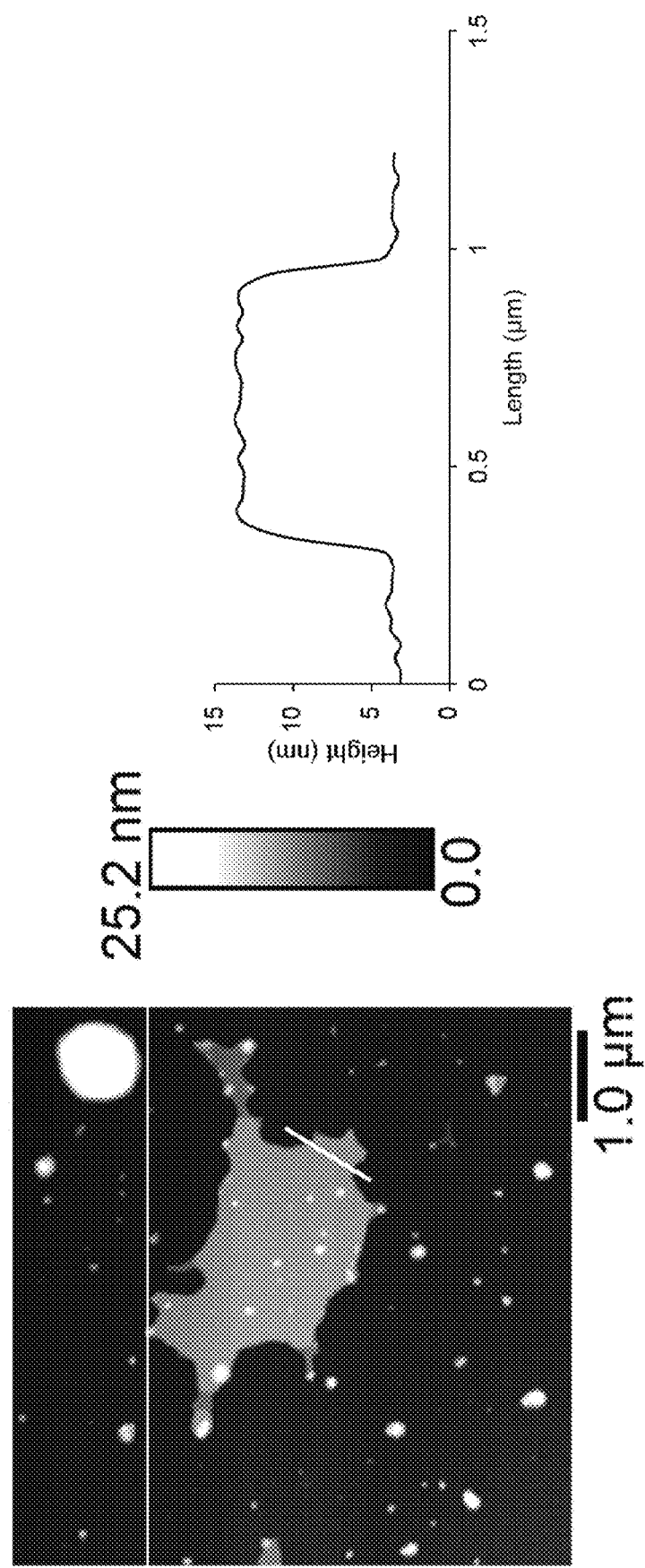
FIG. 9 is an atomic force microscope (AFM) image of electrochemically exfoliated graphene produced from electrochemical exfoliation in accordance with some embodiments of the present disclosure.
Figure 10:
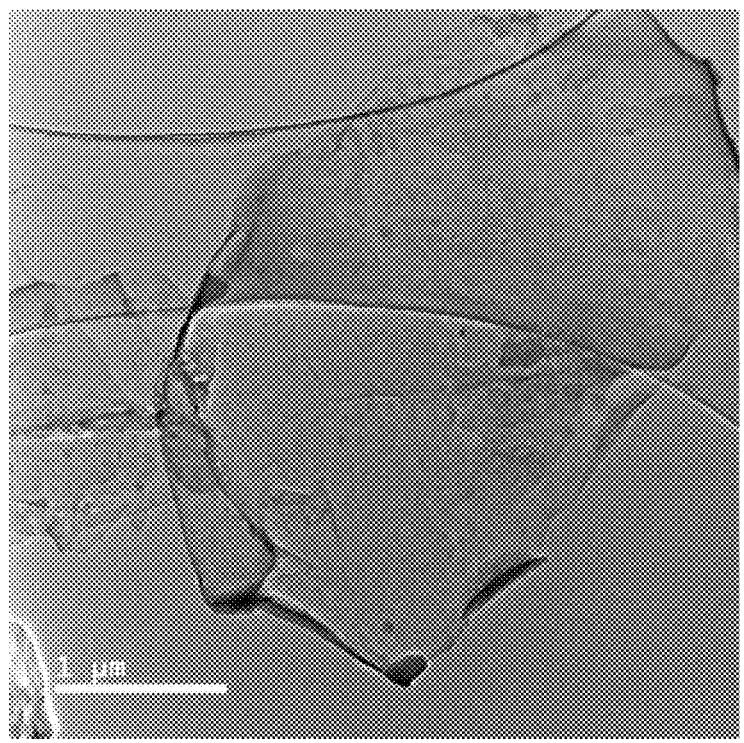
FIG. 10 is a transmission electron microscope (TEM) image of electrochemically exfoliated graphene produced from electrochemical exfoliation in accordance with some embodiments of the present disclosure.
Figure 11:
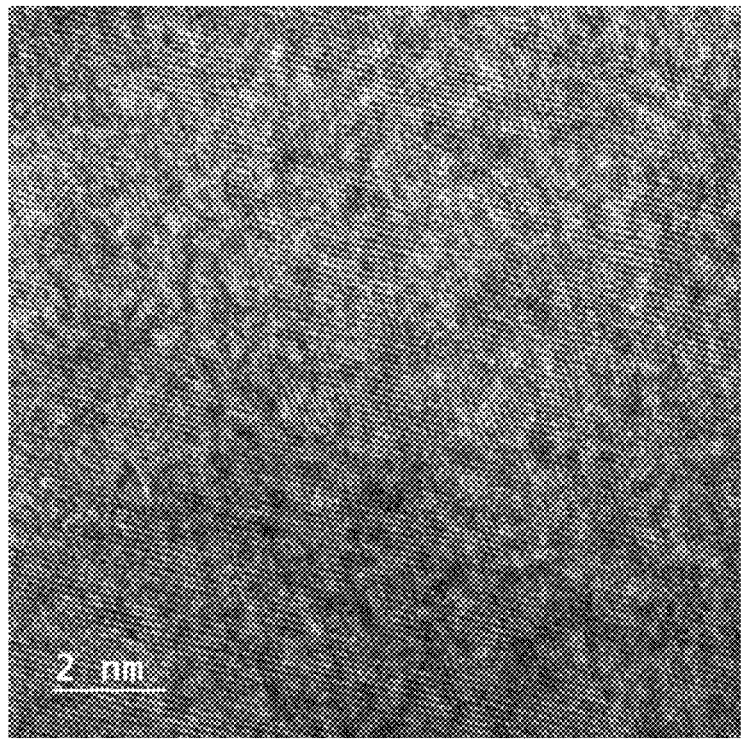
FIG. 11 is a transmission electron microscope (TEM) image of electrochemically exfoliated graphene produced from electrochemical exfoliation in accordance with some embodiments of the present disclosure.

The product electrochemically exfoliated graphene was freeze dried for 24 hours to dry the electrochemically exfoliated graphene to produce a dry graphene powder. The dry graphene powder was analyzed using scanning electron microscopy (SEM). The SEM images are shown in FIGS. 7 and 8. Graphene sheets with lateral dimensions of 1-3 micrometers with overlapping sheets were visible in the SEM images. The dry graphene power was further subjected to atomic force microscopy. Thickness of the dry graphene power was calculated to be 8 nanometers and the aspect ratio was found to be about 250. The dry graphene power was further subjected to atomic force microscopy (AFM), the results of which are shown in FIG. 9. Graphene sheets were clearly visible in the AFM image. The thickness was calculated as 8 nm, corresponding to few layer graphene. The aspect ratio was calculated at about 250. The dry graphene power was further subjected to transmission electron microscopy (TEM), the results of which are show in FIGS. 10 and 11. Graphene sheets are clearly visible from the TEM image. Additionally, it can be observed that nearly transparent sheets are present, confirming the formation of few layer graphene.

Figure 12:
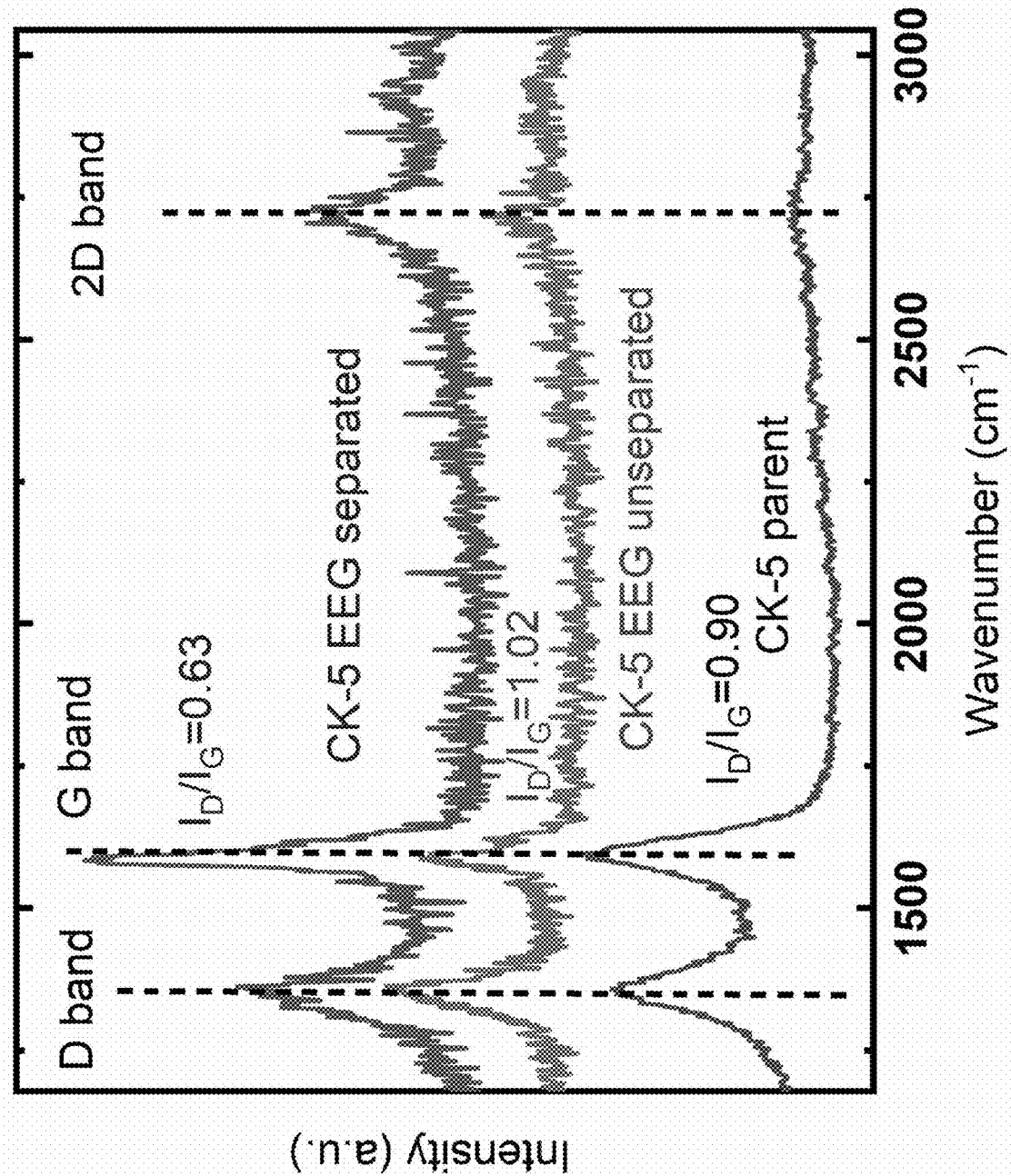
FIG. 12 is a Raman spectra of needle coke fines parent material, a washed exfoliated product, and a dry graphene powder produced from electrochemical exfoliation in accordance with some embodiments of the present disclosure.

Raman spectroscopy of the needle coke fines parent material, washed exfoliated product, and the dry graphene powder was performed. The Raman spectra is shown in FIG. 12 Raman spectra of carbonaceous materials generally give two distinct peaks at ~1350 cm$^{-1}$ (D band) and 1570 cm$^{-1}$ (G band). The G peak is related to the graphitic structure having sp$^2$ hybridization and the D band is related the distorted or defect structure having sp$^3$ hybridization. It was observed from the Raman spectra of FIG. 12 that the dry graphene powder has a significantly stronger signal in the G band as compared to the needle coke fines parent material and the washed exfoliated product, thereby indicating the formation of the sp$^2$ structure in the dry graphene powder. The Raman spectra further indicates the presence of a 2D peak which is characteristic of few layer graphene in the washed exfoliated product and the dry graphene powder. The 2D peak is absent in the needle coke fines parent material which confirm the formation of graphene from the petroleum coke parent material.

Example 2

Three sample of needle coke fines were pre-treated using the DCM and $HNO_3$ pre-treatment process described in Example 1. The electrical conductivity of each of the pre-treated coke samples was measured. The results of the electrical conductivity test are shown in Table 1. It was observed that the conductivity of sample 1 was greater than sample 2 or 3, however, the conductivity is still relatively small.

TABLE 1

|  | Sample 1 | Sample 2 | Sample 3 |
| --- | --- | --- | --- |
| Electrical Conductivity (S/m) | 0.067 | 0.028 | 0.038 |
| Standard Deviation | 0.002 | 0.001 | 0.001 |

Example 3

In this Example, thermal reduction was carried out with the dry graphene powder to test for changes in conductivity. The samples were annealed in a tube furnace as a set temperature and time. The control dry graphene powder was not annealed. Sample 1 was annealed for 12 hours at 500° C., sample 2 was annealed for 24 hours at 500° C., sample 3 was annealed for 12 hours at 900° C., and sample 4 was annealed for 12 hours at 1100° C. The results of the electrical conductivity test are shown in Table 2. It was observed that annealing increased the conductivity and a higher annealing temperature correlated to higher conductivity. However, after 12 hours of annealing, the conductivity only marginally improved.

TABLE 2

|  | Control | Sample 1 | Sample 2 | Sample 3 | Sample 4 |
| --- | --- | --- | --- | --- | --- |
| Electrical Conductivity (S/m) | ~56.9 | ~250 | ~258 | ~345 | ~474 |
| Standard Deviation | 1.2 | 5.3 | 28 | 7.7 | 11.9 |

While compositions, methods, and processes are described herein in terms of "comprising," "containing," "having," or "including" various components or steps, the compositions and methods can also "consist essentially of" or "consist of" the various components and steps. The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the disclosure, additionally, they do not exclude impurities and variances normally associated with the elements and materials used.

All numerical values within the detailed description and the claims herein modified by "about" or "approximately" with respect to the indicated value are intended to take into account experimental error and variations that would be expected by a person having ordinary skill in the art.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited.

What is claimed is:

1. A method of electrochemical exfoliation, comprising: electrochemically exfoliating a parent material comprising coke, wherein the electrochemically exfoliating comprises introducing the parent material into a porous chamber, applying pressure along a length of the porous chamber to thereby compress the parent material in the porous chamber, wherein the pressure is applied by a weight from gravity to a first counter electrode and the porous chamber, wherein the first counter electrode is disposed between the weight and a lateral area of the porous chamber, and applying a potential bias to the parent material while at least a portion of the parent material is in contact with an electrolyte solution to produce a mixture of exfoliated material and unexfoliated parent material, wherein the exfoliated material comprises exfoliated graphene wherein the potential bias is applied to a pair of counter electrodes comprising the first counter electrode and a second counter electrode, wherein the second counter electrode is disposed underneath the porous chamber, wherein a working electrode is disposed in the porous chamber to contact the parent material; and separating at least a portion of the exfoliated material from the unexfoliated parent material.

2. The method of claim 1, wherein the coke comprises needle coke.

3. The method of claim 1, wherein the potential bias is about 12 volts or greater.

4. The method of claim 1, wherein the electrolyte solution comprises ammonium sulfate.

5. The method of claim 1, wherein the separating at least a portion of the exfoliated material from the unexfoliated parent material comprises:
   centrifuging the exfoliated material at conditions sufficient to separate a first sediment and a first supernatant comprising the exfoliated graphene; and
   centrifuging the first supernatant at conditions sufficient to separate a second supernatant and a second sediment comprising the exfoliated graphene.

6. The method of claim 5, wherein the exfoliated material is centrifuged at about 1000 RPM to about 3000 RPM for a period of about 5 minutes to about 15 minutes.

7. The method of claim 5, wherein the first supernatant is centrifuged at RPM ranging from about 3000 RPM to about 6000 RPM for a period of about 15 minutes to about 25 minutes.

8. The method of claim 1, wherein the separating at least a portion of the exfoliated material from the unexfoliated parent material comprises continuous flow centrifuging.

9. The method of claim 1, further comprising annealing at least a portion of the exfoliated graphene at a temperature of about 200° C. to about 3000° C.

10. The method of claim 9, wherein the step of annealing is performed for a period of about 30 minutes to about 24 hours.

11. The method of claim 9, wherein the exfoliated graphene after annealing has a conductivity of about 50 S/m to about 10,000 S/m.

12. The method of claim 1, further comprising contacting the parent material with a solvent and an acid prior to the step of electrochemically exfoliating.

13. The method of claim 12, wherein the acid is nitric acid.

14. The method of claim 1, wherein a molar ratio of carbon to oxygen of the exfoliated material is between about 1000:1 and about 3:1.

* * * * *